March 19, 1946.  C. WALTERS  2,396,904
APPARATUS FOR FORMING CUTTING EDGES ON CUTTING TOOLS
Filed Sept. 30, 1943   2 Sheets-Sheet 1

Inventor
Charles Walters
By Thomas A. Jenckes
Attorney

March 19, 1946.   C. WALTERS   2,396,904
APPARATUS FOR FORMING CUTTING EDGES ON CUTTING TOOLS
Filed Sept. 30, 1943   2 Sheets-Sheet 2
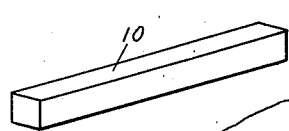
Fig. 5
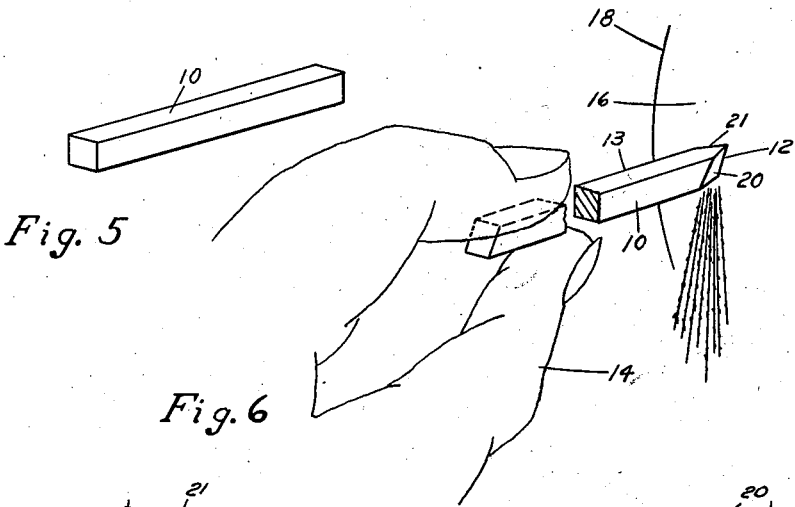
Fig. 6
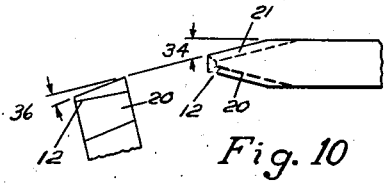
Fig. 10
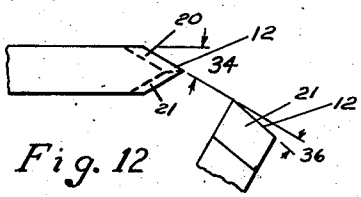
Fig. 12
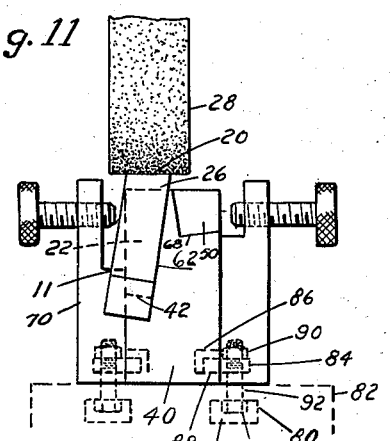
Fig. 11
Fig. 7
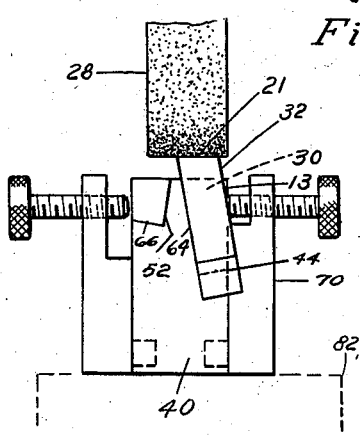
Fig. 13
Fig. 8
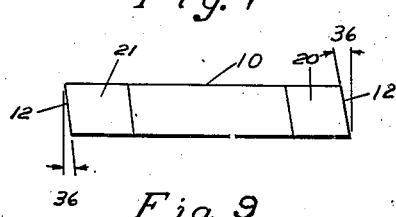
Fig. 9
Inventor
Charles Walters
By Thomas A. Jenckes
Attorney Patented Mar. 19, 1946

2,396,904

UNITED STATES PATENT OFFICE 2,396,904

APPARATUS FOR FORMING CUTTING EDGES ON CUTTING TOOLS

Charles Walters, Johnston, R. I., assignor to George W. Booth, Providence, R. I.

Application September 30, 1943, Serial No. 504,502

5 Claims. (Cl. 51—220)

My invention relates to improvements in forming a cutting edge on a cutting tool, particularly a cutting tool of the type adapted to cut threads. In the prior art it has been standard practice in grinding such a cutting edge to hold the tool to be ground by hand against the grinding surface of the grinding means and forming a cutting edge by first grinding one side thereof and then the other successively until the tool is properly gauged by removing it from contact with the grinding means and inserting it in a standard type gauge. This has rendered the art of forming cutting edges on a cutting tool a slow and laborious process.

An object of my invention therefore is to provide a novel method of forming a cutting edge on a cutting tool with two grindings only, one for each side of the cutting edge which will insure the proper cutting and clearance angles being formed on the tool and thereby obviate the necessity of successive grindings and gaugings in the manner practiced in the prior art. For this purpose after preferably rough grinding a rough edge on the cutting tool in the usual manner, I then rigidly mount said tool on a flat surface inclined from a grinding surface at one-half of the desired cutting angle and tilted from the perpendicular to said grinding surface at the desired angle of clearance, with the edge thereof to be ground projecting beyond said grinding surface, pass grinding means over said grinding surface and said projecting tool end to form one surface of said cutting edge and I then successively mount the other side of the tool on a flat surface similarly inclined in the opposite direction from a grinding surface at one-half the desired cutting angle and tilted from the perpendicular to said grinding surface in the same direction as the first grinding surface at the desired angle of clearance, with the edge thereof to be ground projecting beyond said grinding surface and pass grinding means over said grinding surface and projecting tool end to form the opposite surface of said cutting edge, thereby forming a cutting edge on said tool with the desired cutting angle, namely, the sum of the angles cut on each side thereof and the desired angle of clearance, namely, said angle of tilt.

An object of my invention therefore is to provide a fool-proof method and means for holding a cutting tool while the desired cutting edge is being formed thereon with the desired clearance angle being formed at the same time and a method which insures the provision of the proper cutting edge.

A further object of my invention is to provide a method which is quicker than prior methods, and eliminates the necessity of hand gauging.

A further object of my invention is to provide a novel type of fixture for this purpose, in my preferred embodiment, one which is adapted either to cut a U. S. standard type of thread, namely, one with a cutting angle of 60 degrees with the standard angle of clearance, namely, 10 degrees, or a cutting thread of the Acme standard type having a 29 degree cutting angle and a 7 degree angle of clearance.

These and such other objects of my invention as may hereinafter appear will be best understood from the description of the accompanying drawings which illustrate an embodiment thereof.

In the drawings,

Fig. 1 is a side elevation of the Acme standard thread cutting side of a fixture for grinding an Acme standard thread cutting edge on a cutting tool, constructed in accordance with my invention.

Fig. 2 is a side elevation of the opposite U. S. standard thread cutting side of said fixture for grinding a U. S. standard thread cutting edge on a cutting tool.

Figure 1:
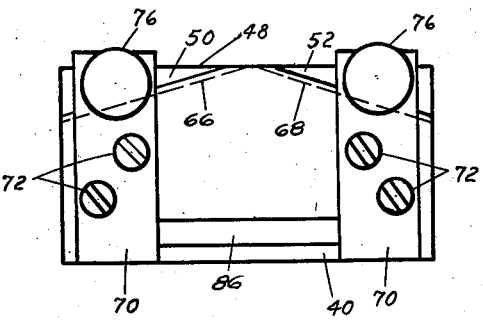
Figure 4:
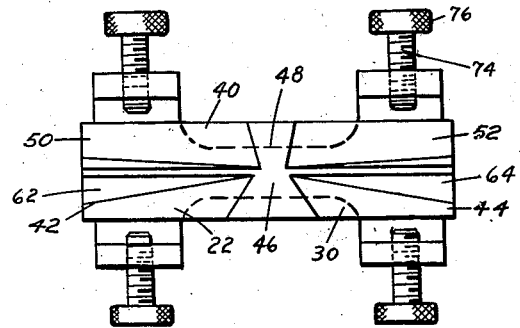
Fig. 4 is a plan view of the embodiment of my invention shown in Figs. 1, 2 and 3.
Figure 2:
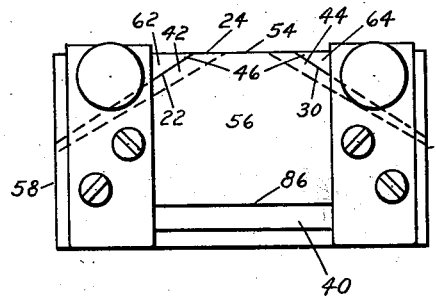
Figure 3:
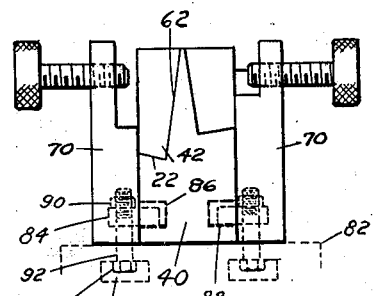
Fig. 3 is an end elevation of the embodiment of my invention shown in Figs. 1 and 2, suitably mounted on a table.

Figs. 5-9 diagrammatically illustrate steps of my improved method; Fig. 5 being a perspective view of a blank for forming a cutting tool, Fig. 6 being a perspective view diagrammatically illustrating the initial step preferably employed of rough grinding a rough cutting edge on the cutting tool by holding it against a grinding wheel by hand, Fig. 7 being an end elevation of a cutting tool rigidly mounted on a surface of my improved fixture shown in Figs. 1-4 inclined in one direction from the grinding surface and tilted and in the act of having one face of the cutting edge ground thereon by passing grinding means over said grinding surface, Fig. 8 being an end elevation of my improved tool mounted on the oppositely inclined and similarly tilted surface of the fixture shown in Figs. 1-4 and in the act of having the opposite face of the cutting edge ground thereon by passing grinding means over said grinding surface, and Fig. 9 being a side view of a cutting tool having a U. S. standard thread cutting edge ground on one end thereof and an Acme standard thread cutting edge ground on the opposite end thereof constructed in accordance with my improved method.

Fig. 10 is a diagrammatic side view and Fig. 11 is a diagrammatic end view of a cutting tool end adapted to cut an Acme standard thread produced in accordance with my invention.

Fig. 12 is a diagrammatic side view and Fig. 13 is a diagrammatic end view of a cutting tool end adapted to cut a U. S. standard thread, produced in accordance with my invention.

In the drawings, wherein like characters of reference generally indicate like parts throughout, 10 generally indicates a cutting tool having a desired cutting edge 12 formed thereon. As stated heretofore, in the prior art it has been standard practice as shown in Fig. 6 to grind the cutting edge 12 on the cutting tool 10 by holding the tool 10 in the hand 14 against a grinding surface 16 such as that of the rotating grinding wheel 18 shown in Fig. 6. It has been necessary to first grind one face 20 and then the opposite face 21 thereof until said faces gauge the desired cutting angle in a suitable gauge, a suitable gauge for this purpose being made by Brown & Sharpe Manufacturing Co. of Providence, Rhode Island. This has necessitated repeated measurements and grindings and has been a very slow method and one which provides a not too accurate cutting edge. As stated, my invention is particularly adapted for use on a thread cutting tool adapted to cut a U. S. standard thread of a 60 degree cutting angle or a so-called Acme standard thread of a 29 degree cutting angle, said angles being adapted to cut standard sizes of threads although tools of any other cutting or clearance angles may be readily ground in accordance with my invention. If desired, employing my improved method, the cutting edge may first be rough ground in the standard manner indicated in Fig. 6 but after it is rough ground prior to any accurate gauging one side 11 of said tool 10 is rigidly mounted on a flat surface 22 inclined from a grinding surface 24 which is preferably horizontal at one-half only of the desired cutting angle (if a U. S. standard thread of 60 degrees is desired at an angle of 30 degrees or if an Acme standard thread of 29 degrees is desired at an angle of 14½ degrees) and tilted from the perpendicular to said flat surface 24 the desired angle of clearance (if a U. S. standard thread be desired, at an angle of 10 degrees or if an Acme standard thread be desired at an angle of 7 degrees) with the end 26 to be ground projecting beyond said grinding surface 24, and grinding means, such as the grinding wheel 28 is passed over said grinding surface 24 and said projecting tool end 26 to form one surface 20 of said cutting edge. I then successively rigidly mount the opposite side 13 of said cutting tool 10 on a flat surface 30 similarly inclined in the opposite direction from the grinding surface 24 or a grinding surface bearing a similar inclination to the surface 30, at one-half the desired cutting angle (30 degrees if cutting a U. S. standard thread and 14½ degrees if cutting an Acme standard thread) and tilted from the perpendicular to said grinding surface 24 in the same direction as said flat surface 22 at the desired angle of clearance (10 degrees if cutting a U. S. standard thread and 7 degrees if cutting an Acme standard thread) with the edge 32 thereof to be ground projecting beyond said grinding surface 24 and the grinding means 28 is passed over the grinding surface and projecting tool end 32 to form the opposite surface 21 of said cutting edge 12, thereby forming a cutting edge 12 on said tool 10 with the desired cutting angle 34 and the desired angle of clearance 36.

While my improved method may be employed on a single fixture or on a multiplicity of fixtures having the desired cutting and clearance angles between the grinding and mounting surfaces I preferably employ both surfaces on a single fixture 40 as shown in Figs. 1–4 and 7 and 8, the tool mounting surfaces 22 and 30 extending in opposite directions from the grinding surface 24 at one-half of the cutting angle desired in the cutting edge in the cutting tool for the type of thread being formed thereon and if desired suitable surfaces for cutting a different type of thread may be formed similarly on the same fixture, those for one type of thread or edge being preferably formed on one side of the fixture and those for cutting a different type of thread being formed on the opposite side of the fixture as in the manner shown.

In the preferred embodiment shown, said flat surfaces 22 and 30 are the bases of grooves 42 and 44, cut or otherwise formed on said fixture 40. In the preferred fixture 40 shown, I provide two sets 46 and 48 of grooves 42 and 44 and 50 and 52 respectively, the grooves 42 and 44 extending substantially from the center of the top wall 54 or grinding surface 24 thereof down a side wall 56 thereof to each respective end wall 58 and 60 with the respective bases 22 and 30 of said grooves extending downwardly from said top wall 54 or grinding surface 24 in opposite directions at one-half the cutting angle desired in the pointed edge 12 of the cutting tool 10 and tilted inwardly from the perpendicular to said grinding surface 24 at the angle of clearance desired in the finished tool. Each groove 42 and 44 has an inner wall 62 and 64 inclined inwardly and upwardly from said respective base 22 or 30 at right angles therefrom and extending to said top wall 54, whereby the grinding wheel 28 passed over the top wall 54 of said fixture may grind successively the cutting edges 20 and 21 on a cutting tool 10, mounted successively on the bases 22 and 30 of said grooves 42 and 44 having the desired cutting angle 34 and the desired angle of clearance 36 in the embodiment shown to cut a U. S. standard thread. The opposite set 48 of grooves 50 and 52 have bases inclined at the desired angles to cut a different type of thread namely an Acme standard thread.

In the embodiment shown in the tool for grinding a U. S. standard thread, the bases 22 and 30 are inclined downwardly at 30 degrees and tilted 10 degrees from the perpendicular to form a U. S. standard cutting edge to cut a U. S. standard thread and the bases 66 and 68 of the grooves 50 and 52 of the opposite set 48 are each inclined downwardly 14½ degrees and tilted at an angle of 7 degrees to form a cutting tool capable of cutting an Acme standard thread.

Suitably means are provided for rigidly clamping the tool successively in said grooves during the grinding operation in the preferred embodiment shown comprising plates 70 each secured to opposite ends of the lower portions of one side wall of the fixture by the screws 72 and having a clamping bolt 74 having a turning head 76 projecting inwardly through said plate to clamp the tool 10 against the respective inner wall of each respective groove in the manner shown. Means 80 are also provided to detachably clamp the tool 40 to a table 82 which may comprise a magnetic chuck or suitable mechanical means such as the horizontal clamping bar 84 adapted to fit in a horizontal groove 86 in each side wall of the fixture 40 and urged downwardly against the base 88 of said groove by the nut 90 adjustably mounted on the threaded stem of a bolt 92 movable in a slot 94 formed in the table 82 shown in Figs. 7 and 8.

It is thus apparent that if it be desired to grind the cutting edge on a suitable tool 10 after it has been rough ground in the manner shown in Fig. 6, said tool is first mounted on the groove 42 so that one side 11 thereof rests on the base 22 and the inner side rests on the inner wall 62 thereof with its end 26 projecting above the top wall 54 of said fixture from the grinding surface 24, and rigidly clamped thereto by a clamping bolt 74, the grinding wheel 28 is then passed over said surface 20, the tool 10 is then removed from the tool groove 42 shown in Fig. 7 and inserted opposite side up into the tool groove 44 shown in Fig. 8 and clamped thereto by means of a clamping bolt 74 and the grinding wheel 28 is then passed over the surface 32 of said edge and after said second grinding, a cutting edge 12 having the desired cutting angle 34 and the desired angle of clearance 36 is provided.

It is apparent therefore that I have provided a novel method of forming a cutting edge on a cutting tool and a novel fixture therefor with the advantages explained above.

It is understood that my invention is not limited to the specific embodiment shown or method described and that various deviations may be made therefrom without departing from the spirit and scope of the appended claims.

What I claim is:

1. A fixture for grinding a cutting edge on a cutting tool, having a base, end walls, side walls and a top wall, said fixture having grooves therein, each extending from substantially the center portion of the top wall thereof down a side wall thereof to one end wall thereof in opposite directions and having a bottom wall extending downwardly at half the cutting angle desired in the pointed edge of the cutting tool and tilted inwardly at the angle of clearance desired in the finished tool and an inner wall inclined inwardly and upwardly at a right angle from said bottom wall, whereby a grinding wheel passed successively over the top wall of said fixture may grind a cutting edge on the projecting end of a cutting tool mounted successively in said grooves having the desired cutting angle and the desired angle of clearance and means for rigidly clamping said tool in said grooves during the grinding operations.

2. A fixture for grinding a cutting edge on a cutting tool, having a base, end walls, side walls and a top wall, said fixture having grooves therein, each extending from substantially the center portion of the top wall thereof down a side wall thereof to one end wall thereof in opposite directions and having a bottom wall extending downwardly at half the cutting angle desired in the pointed edge of the cutting tool and tilted inwardly at the angle of clearance desired in the finished tool and an inner wall inclined inwardly and upwardly at a right angle from said bottom wall, whereby a grinding wheel passed successively over the top wall of said fixture may grind a cutting edge on the projecting end of a cutting tool mounted successively in said grooves having the desired cutting angle and the desired angle of clearance.

3. A fixture for grinding a cutting edge on a cutting tool, having a base, end walls, side walls and a top wall, said fixture having grooves therein, each extending from substantially the center portion of the top wall thereof down a side wall thereof to one end wall thereof in opposite directions and having a bottom wall extending downwardly at 30 degrees and tilted inwardly at 10 degrees and an inner wall inclined inwardly and upwardly at a right angle from said bottom wall, whereby a grinding wheel passed successively over the top wall of said fixture may grind a U. S. standard thread cutting edge on the projecting end of a cutting tool mounted successively in said grooves having a cutting angle of 60 degrees and an angle of clearance of 10 degrees.

4. A fixture for grinding a cutting edge on a cutting tool, having a base, end walls, side walls and a top wall, said fixture having grooves therein, each extending from substantially the center portion of the top wall thereof down a side wall thereof to one end wall thereof in opposite directions and having a bottom wall extending downwardly at 14½ degrees and tilted inwardly at 7 degrees and an inner wall inclined inwardly and upwardly at a right angle from said bottom wall, whereby a grinding wheel passed successively over the top wall of said fixture may grind an Acme standard thread cutting edge on the projecting end of a cutting tool mounted successively in said grooves having a cutting angle of 29 degrees and an angle of clearance of 7 degrees.

5. A fixture for grinding a cutting edge on a cutting tool, having a base, end walls, side walls and a top wall, said fixture having two sets of two grooves therein, one in each side wall thereof, one set having each groove thereof extending from substantially the center portion of the top wall thereof down a side wall thereof to one end wall thereof in opposite directions and having a bottom wall extending downwardly at 30 degrees and tilted at 10 degrees and an inner wall inclined inwardly and upwardly at a right angle from said bottom wall, whereby a grinding wheel passed successively over the top wall of said fixture may grind a U. S. standard thread cutting edge on a cutting tool mounted successively in said grooves having the desired cutting angle of 60 degrees and the desired angle of clearance of 10 degrees and the other set having each groove extending from substantially the center portion of the top wall thereof down a side wall thereof to one end wall thereof in opposite directions and having a bottom wall extending downwardly at 14½ degrees and tilted inwardly at 7 degrees and an inner wall inclined inwardly and upwardly at a right angle from said bottom wall, whereby a grinding wheel passed successively over the top wall of said fixture may grind an Acme standard thread cutting edge on a cutting tool mounted successively in said grooves having the desired cutting angle of 29 degrees and the desired angle of clearance of 7 degrees.

CHARLES WALTERS.